United States Patent [19]

Igaku

[11] Patent Number: 5,209,708

[45] Date of Patent: * May 11, 1993

[54] APPARATUS FOR CHANGING THE SPEED

[75] Inventor: Shoji Igaku, Nara, Japan

[73] Assignee: Matex Co., Ltd., Osaka, Japan

[*] Notice: The portion of the term of this patent subsequent to Dec. 24, 2008 has been disclaimed.

[21] Appl. No.: 618,633

[22] Filed: Nov. 27, 1990

[30] Foreign Application Priority Data

Nov. 27, 1989 [JP] Japan .................. 1-308198

[51] Int. Cl.$^5$ ............... F16H 01/46; F16H 03/44; F16H 57/10
[52] U.S. Cl. ................... 475/156; 475/154; 475/157; 475/317; 475/320
[58] Field of Search ............. 475/154, 156, 317, 320, 475/321, 322, 337, 157

[56] References Cited

U.S. PATENT DOCUMENTS

| Re. 29,993 | 5/1979 | Wagner | 475/290 X |
|---|---|---|---|
| 2,041,723 | 5/1936 | Nygren | 475/337 X |
| 2,564,271 | 8/1951 | Millns | 475/317 |
| 2,591,967 | 4/1952 | Ridgley et al. | 475/337 |
| 2,848,908 | 8/1958 | Hollis | 475/320 X |
| 2,900,848 | 8/1959 | Henn-Collins | 475/290 X |
| 3,115,204 | 12/1963 | Dence | 475/322 X |
| 3,559,507 | 2/1971 | Wagner | 475/270 |
| 3,638,771 | 2/1972 | Chana | 192/3.52 X |
| 4,060,010 | 11/1977 | Heden | 475/183 |
| 4,365,525 | 12/1982 | Imazaike | 475/337 |
| 4,592,251 | 6/1986 | Mason | 475/322 X |
| 4,706,521 | 11/1987 | Anderson et al. | 475/322 X |
| 4,791,833 | 12/1988 | Sakai et al. | 475/320 X |
| 4,869,139 | 9/1989 | Gotman | 475/337 X |
| 5,074,832 | 12/1991 | Igaku | 475/317 |

FOREIGN PATENT DOCUMENTS

| 2148938 | 4/1972 | Fed. Rep. of Germany | 475/337 |
|---|---|---|---|
| 56-160462 | 12/1981 | Japan | 74/665 B |
| 57-65424 | 4/1982 | Japan . | |
| 58-24643 | 2/1983 | Japan . | |
| 62-167960 | 7/1987 | Japan | 475/320 |

Primary Examiner—Leslie A. Braun
Assistant Examiner—David E. Henn
Attorney, Agent, or Firm—Cushman, Darby & Cushman

[57] ABSTRACT

An apparatus for changing the rotational speed of a mechanism includes an input shaft, several planetary gear units, an output rotor, a rotating disc and a casing. The planetary gear units are connected together. The sun gear of the first unit is connected to the input shaft and the carrier of the last unit is connected to output rotor. An internal gear of one of planetary gear units can rotate in the casing but can be stopped by an internal gear stopping device. The input shaft is connected to the rotating disc. The rotating disc can be brought into contact with the output rotor by a disc-contacting device. The disc-contacting device and the internal gear stopping device are driven in a complementary manner. When the internal gear stopping device is excited and the disc-contacting device is unexcited, the output rotor rotates at a low speed level. When the disc-contacting device is excited and the internal gear stopping device is unexcited, the output rotor rotates at a high speed level. This apparatus can be used as a driving device for a drum type electric washing machine.

6 Claims, 4 Drawing Sheets

APPARATUS FOR CHANGING THE SPEED

FIELD OF THE INVENTION

This invention relates to an apparatus for changing the rotational speed of a mechanism at two levels, both clockwise and counterclockwise, by using planetary gear units.

BACKGROUND OF THE INVENTION

A new type of electric washing machine has been proposed. We name it a "drum type" of washing machine. It has a drum which rotates around a horizontal axis, unlike the conventional washing machine with a drum which rotates around a vertical axis. We now call the drum of the former a "vertical drum", because the rotation plane of the drum is a vertical plane. When we place the washing and cleaning material in the vertical drum, shut the cover and turn on the switch, all processes of laundering-washing, rinsing, dehydrating and also drying—are automatically done in succession by changing the rotation speed of the drum in two stages. In the washing and rinsing processes, the vertical drum rotates at a low speed with water, alternatively in both directions—clockwise and counterclockwise. In the dehydrating process, the vertical drum rotates at a high speed without water in one direction. In the drying process, the drum rotates at the low speed under application of heat without water in both directions or in one direction.

In comparison with the conventional electric washing machine, the drum-type washing machine is advantageous in that it can complete the laundering process, including drying, in the same drum and save water in the washing and rinsing processes.

The drum type of electric washing machine requires two different drum rotation speeds according to the various laundry processes. In addition, it is preferable that the drum can rotate both in a clockwise direction and in a counterclockwise direction. Thus, in the drum type of washing machine, the drum is required to rotate at two different speeds, both clockwise and counterclockwise.

For this purpose, an apparatus for changing the rotational speed of a mechanism which comprises a motor with a convertible number of poles (four poles in the washing process and two poles in the dehydrating process), a centrifugal clutch and a reduction gear was invented. Namely, this apparatus can select two states of transmission; one state is where the motor shaft is connected by a reduction gear to the output shaft and the other is where the motor is directly connected to the output shaft. Either of the two states is selected by two clutches.

However, this apparatus requires at least two clutches for converting speed. Further, the clutch which connects the carrier of the reduction gear with the output shaft has a very complicated structure. Further yet, in the case of high speed rotation, the drum can rotate in only one direction, because a centrifugal clutch which is inherently unilateral connects the motor shaft to the output shaft. Thus, the drum cannot rotate both clockwise and counterclockwise at high speed.

Japanese Patent Laying Open. No. 57-65424 (Apr. 21, 1982) has proposed an apparatus which can convert the rotation speed of a mechanism at two stages by changing the direction of rotation. This apparatus uses a ratchet which also has an inherently unilateral character. For example, the rotation torque can be transmitted only clockwise in the high speed state and counterclockwise in the low speed state. It can not be used as the driving device of the drum type of washing machine, because of its double-unilateral character.

Japanese Patent Laying Open No. 58-24643 (Feb. 14, 1983) has proposed another apparatus which can convert the rotation speed of a mechanism using a planetary gear unit. The internal gear is fixed to the casing. The carrier is not connected to the output shaft directly, but intermediately by a collar which can be moved in an axial direction on the surface of the output shaft. When the collar is moved toward the input shaft, the collar connects the output shaft with the input shaft and the output shaft rotates rapidly. When the collar is moved toward the output shaft, the collar connects the output shaft with the carrier of the planetary gear unit and the output shaft rotates slowly.

The purpose of this invention is to provide an apparatus for changing the rotational speed of a mechanism which can transmit rotational torque both clockwise and counterclockwise, at both a high speed level and at a low speed level.

SUMMARY OF THE INVENTION

The apparatus of this invention comprises an input shaft, an output rotor, and either one planetary gear unit or a plurality of planetary gear units being successively connected and being arranged between the input shaft and the output rotor.

In the case of the successively connected planetary gear units, a carrier of a unit is connected to a sun gear of the next unit, the sun gear of the first unit is connected to the input shaft and the carrier of the last unit is connected to the output rotor. One of the planetary gear units has an internal gear which can choose alternatively one of two states—a free rotation state and a rest state in a casing. The internal gears of the other planetary gear units are fixed to the casing.

In the case of one planetary gear unit, the sun gear is connected to the input shaft, the carrier is connected to the output rotor, and the internal gear can choose one of two states—a free rotation state and a rest state in the casing.

The input shaft pierces center holes of the planetary gear units or the output rotor. A rotating disc is mounted on the input shaft near the output rotor. Furthermore, a disc-contacting device is installed for bringing the rotating disc into contact with the output rotor in a mechanical manner or a magnetic manner. The carrier of the last planetary gear unit is connected to the output rotor without an intermediate clutch.

The internal gear which is permitted to select the free rotating state or the rest state is supported rotatably in the casing. To distinguish the unit having the internal gear, the unit is now called a "converter unit" and the internal gear is called a "converter internal gear". An internal gear stopping device is installed for braking the internal gear by an adequate means from the side. Thus, the disc-contacting device and the internal gear stopping device can be driven in a complementary manner in the apparatus mentioned above. Namely, when the internal gear stopping device is actuated, the disc-contacting device is at rest and when the disc-contacting device is actuated, the internal gear stopping device is at rest.

Therefore, when the converter internal gear is braked by actuating the internal gear stopping device and the disc contacting device is at rest, the output rotor rotates at a low speed level, either clockwise or counterclockwise. On the other hand, when the converter internal gear is permitted to rotate freely by releasing the internal gear stopping device and the disc contacting device is driven, the output rotor rotates at a high speed level, either clockwise or counterclockwise.

Any cases other than the two discussed cases are prevented. Namely, the simultaneous free rotation of the converter internal gear with the disc-contacting device at rest is to be prevented. Similarly, the simultaneous rest state of the converter internal gear with the actuation of the disc-contacting device is also to be prevented.

The functions of the two cases will now be explained.

(a) Low speed rotation

The converter internal gear is braked and the disc-contacting device is released. In this case, the converter unit acts only as a reduction gear. The reduction rate of the converter unit is designated by $R_\square$. The reduction rates of other planetary units are designated by $R_1, R_2 \ldots, R_n$. The rotation speed of the input shaft is denoted by A and that of the output rotor is denoted by B. The relation of A to B is given by $$B = \frac{1}{R_n \ldots \ldots \ldots R_1 R_\square} A \quad (1)$$

This means that the output rotor rotates at a low speed and the direction of rotation of the output rotor is the same as the direction of the input shaft.

Even in this case, the rotating disc is rotating at a high speed equal to the rotation speed A of the input shaft. But the difference of the rotation speeds presents no difficulty, because there is an air gap between the rotating disc and the output rotor, even though the gap is narrow.

(b) High speed rotation

The converter internal gear is permitted to rotate freely by releasing the internal gear stopping device and actuating the disc-contacting device. The rotating disc which is rotating at an input rotation speed A is kept in contact with the output rotor. Thus, the output rotor rotates at a speed A. Namely $$B = A \quad (2)$$

Therefore, the output rotor rotates at a high speed. What enables the output rotor to rotate freely is the free rotation of the converter internal gear.

However, the free rotation speed of the internal gear of the converter unit is considerably high, as will now be explained. There are a plurality of planetary gear units. The units positioned before the converter unit are designated by numerals 1, 2 . . . , and k.

The product Q of the reduction rates $R_1, R_2, \ldots, R_k$ of the forward units is defined by $$Q = \prod_{i=1}^{k} R_i \quad (3)$$

The other units positioned after the converter unit are designated by numerals (k+1), . . . , and n. The product T of the reduction rates $R_{k+1} \ldots$ and $R_n$ of the rear units is written as $$T = \prod_{i=K+1}^{n} R_i \quad (4)$$

The rotation speed of the sun gear of the converter unit is denoted by $S_\square$. This rotation speed is calculated by dividing the input rotation by the reduction rate Q. Thus $$S_\square = \frac{A}{Q} \quad (5)$$

The rotation speed of the converter carrier is denoted by $C_\square$. This is obtained by multiplying the output rotation B by T. Then $$C_\square = TB = TA \quad (6)$$

In the converter unit, the sun gear rotates at a low speed and the carrier rotates at a high speed. By the action of the two gears, the internal gear also rotates at another high speed. This is a rather abnormal state, because a sun gear rotates faster than a carrier in a normal planetary gear assembly. Thus, the speed of rotation of the internal gear in the casing can now be calculated.

$Z_s$ and $Z_i$ denote the tooth numbers of the sun gear and the internal gear, respectively. The rotation speeds of the sun gear, the carrier and the internal gear are designated by $S_\square, C_\square, I_\square$. There is a relation between the variables.

$$S_\square Z_s + I_\square Z_i = (Z_s + Z_i) C_\square \quad (7)$$

This is a fundamental equation of a planetary gear unit. Substituting Eq.(5) and Eq.(6) into Eq.(7), we obtain the rotation speed of the internal gear of the converter unit.

$$I_\square = \left\{ \frac{Z_s}{Z_i} \left( T - \frac{1}{Q} \right) + T \right\} A \quad (8)$$

This is a considerably high speed of rotation. Therefore, the bearing device supporting the converter internal gear in the casing should be designed with sufficient consideration.

BRIEF DESCRIPTION OF THE DRAWINGS

The accompanying drawings which are incorporated in and constitute a part of this specification, illustrate an embodiment of the invention and together with the description, serve to explain the principle of the invention.

IN THE DRAWINGS

Figure 1:
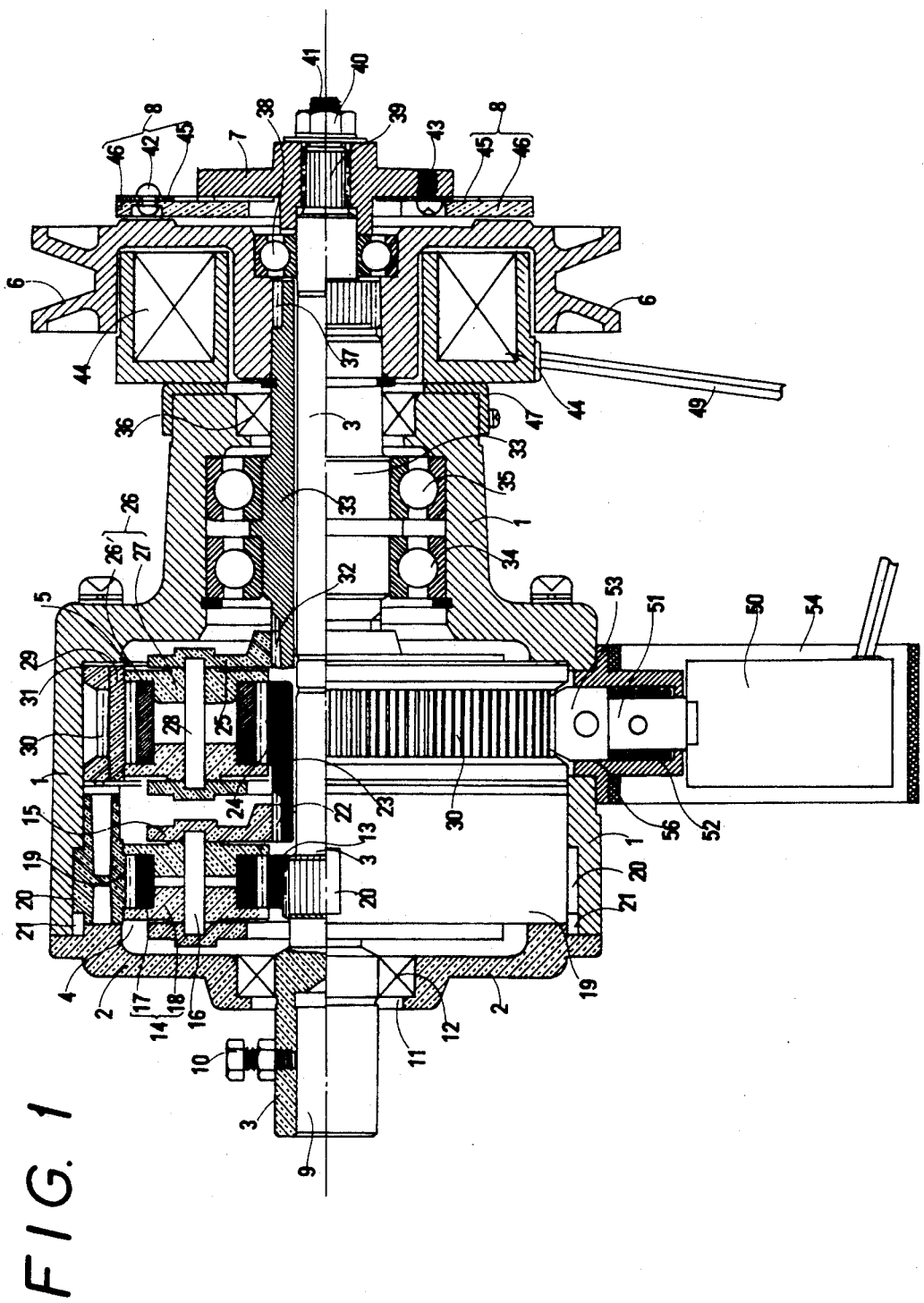

FIG. 1 is a vertically sectioned front view of an apparatus for changing the rotational speed of a mechanism as one embodiment of this invention.

Figure 2:
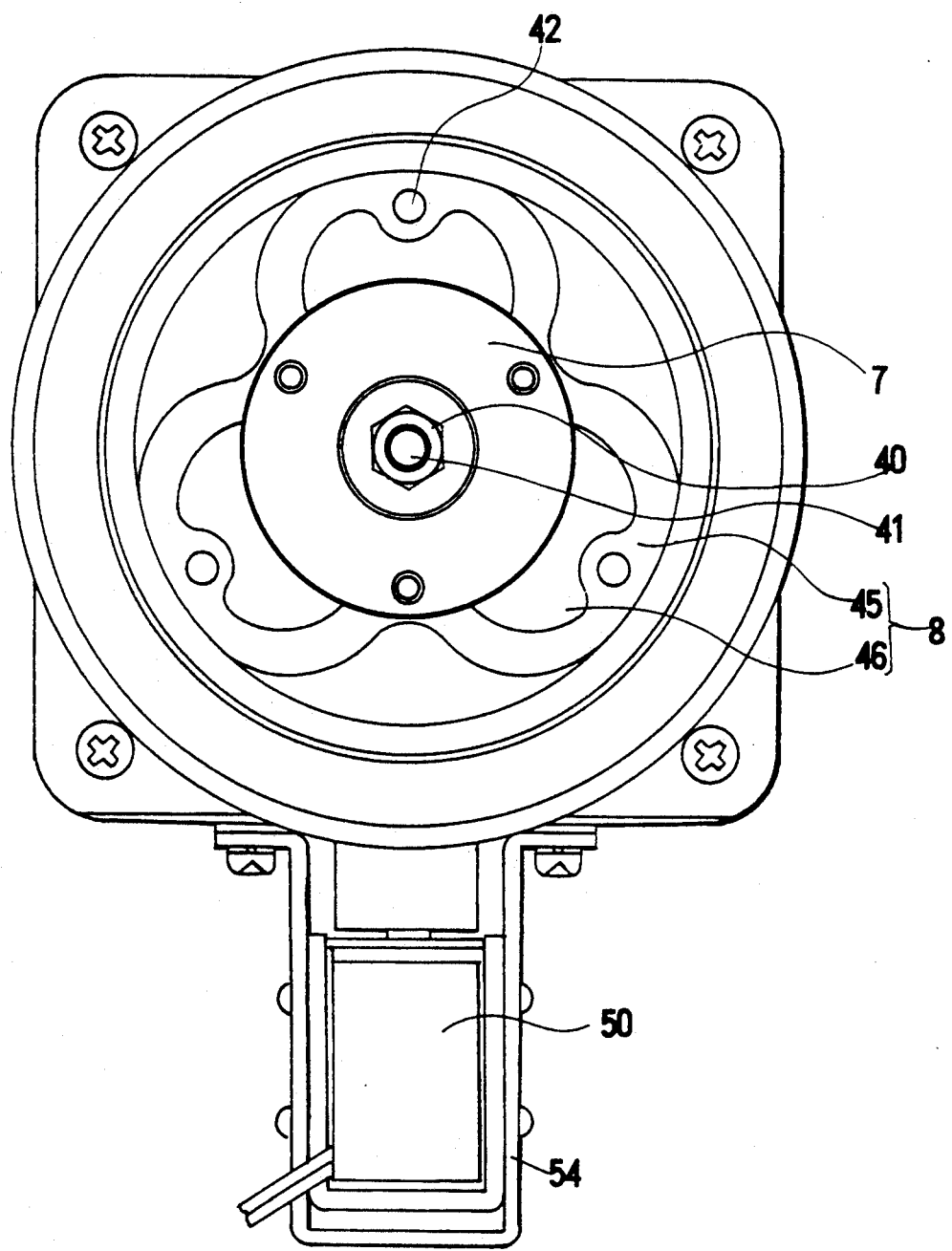

FIG. 2 is a right side view of the embodiment.

Figure 3:
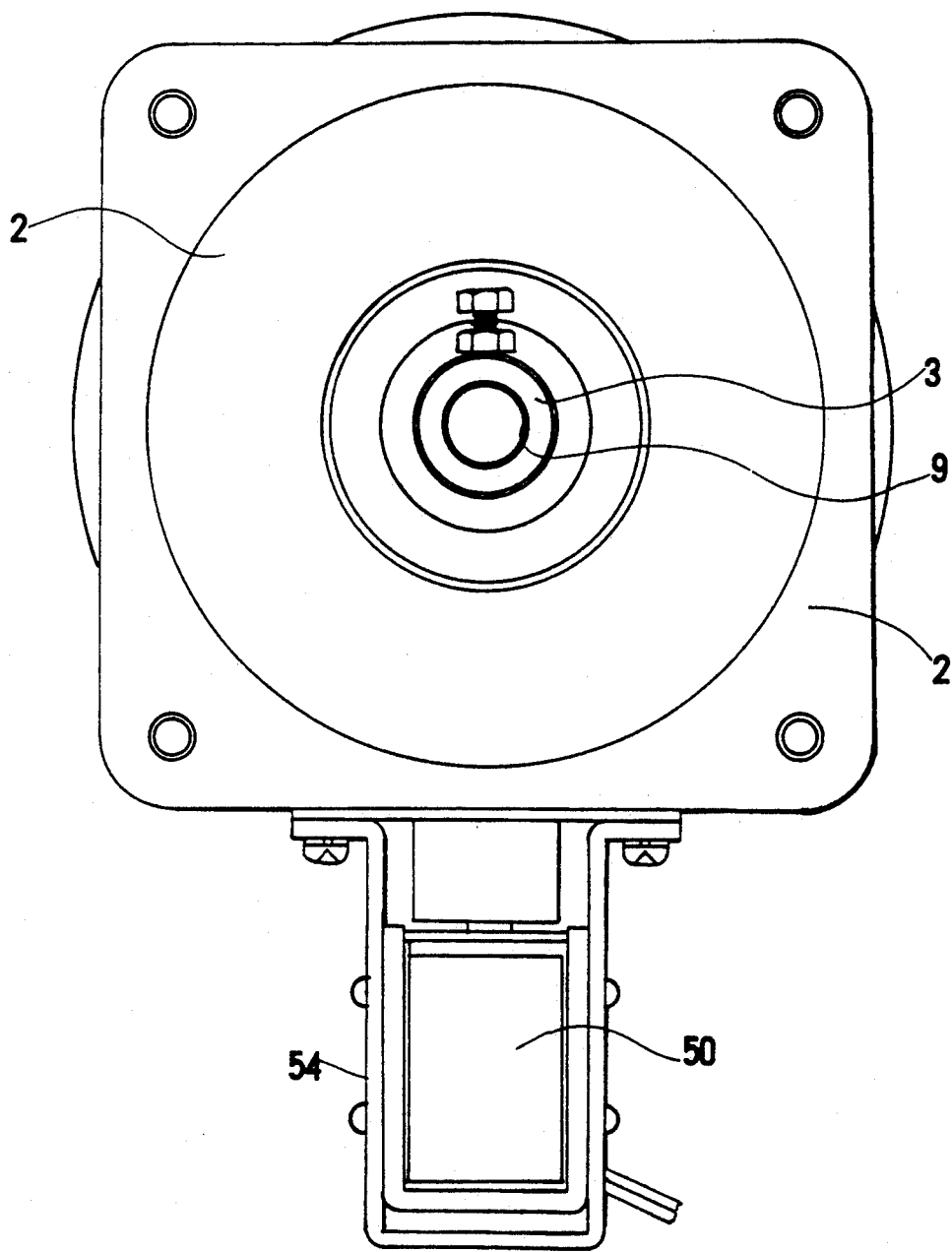

FIG. 3 is a left side view of the embodiment.

Figure 4:
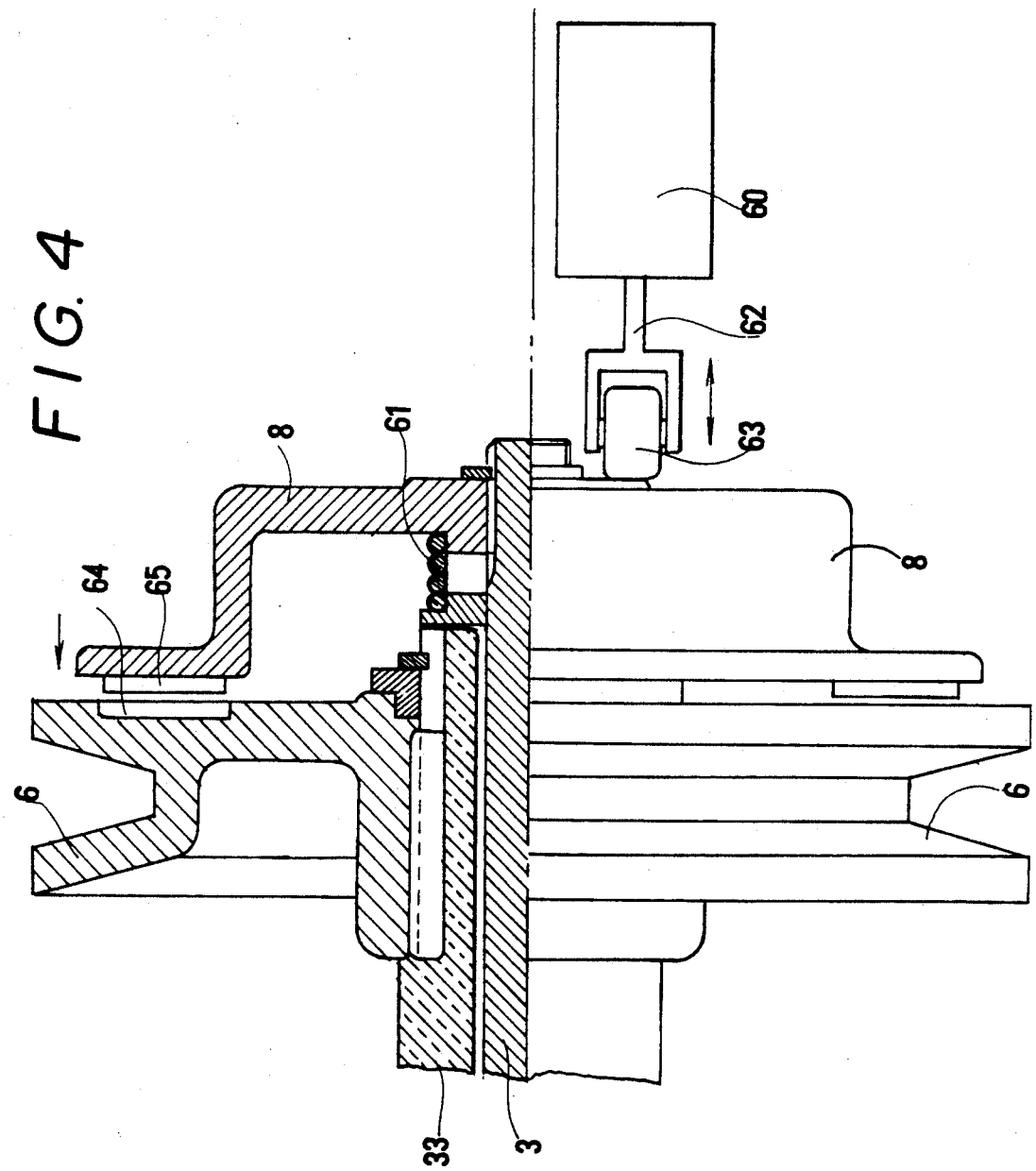

FIG. 4 is a partially sectioned front view of another embodiment of the disc contacting device.

DETAILED DESCRIPTION OF THE PREFERRED EMBODIMENT

This apparatus comprises a casing consisting of a casing body (1) and a cover (2), an input shaft (3), a first planetary gear unit (4) and a second planetary gear unit (5) which are mounted in the casing. The casing body (1) is a stepped cylinder having a cylindrical part with a wider inner diameter and another cylindrical part with a narrower inner diameter. In the wider cylindrical part, the first planetary gear unit (4) and the second planetary gear unit (5) are mounted in succession such that the center axes coincide with each other. The first planetary gear unit (4) is fixed to the casing, but the second planetary gear unit (5) is rotatably mounted in the casing.

The input shaft (3) fully pierces the center axis of the casing. Near the end of the input shaft projecting out of the casing, an output rotor (6) is mounted so as to be permitted to rotate freely relative to the input shaft (3).

On the outer side of the output rotor (6), a rotating hub (7) is mounted on the end of the input shaft (3). Furthermore, a rotating disc (8) is attached to the rotating hub (7). The rotating disc (8) faces the output rotor (6) and is separated from the output rotor (6) by a narrow air gap.

On an input end of the input shaft (3), a connection bore (9) is perforated in the axial direction. A motor shaft (not shown in the figures) is inserted into the connection bore (9) and fixed by a fixation bolt (10). An opening (11) is perforated at the center of the cover (2). An oil seal (12) is fitted between the opening (11) and the input shaft (3).

The first planetary gear unit (4) comprises a sun gear (13) at the center, three or four planetary gears (14) meshing with the sun gear (13), a carrier (15) and an internal gear (19) meshing with the planetary gears (14). The planetary gears (14) are rotatably supported by planetary shafts (16), whose ends are held by the carrier (15). In this example, the planetary gear consists of a central planetary gear part (17) and two planetary discs (18) and (18) supporting the planetary gear part (17) from the sides. The outer diameter of the planetary gear part (17) is bigger than the diameter of the tooth edge circle of the planetary gear part (17).

The internal gear (19) meshing with the planetary gears (14) has a plurality of radial protrusions (20) on the outer surface for fixing it in the casing. In accordance with the shape of the internal gear (19), longitudinal inner grooves (21) are shaped on the inner surface of the casing body (1). The internal gear (19) is fixed in the casing by fitting the radial protrusions (20) into the inner grooves (21) of the casing. The first planetary gear unit (4) acts as a reduction gear.

A spline (22) is shaped on an output hole of the carrier (15) of the first planetary gear unit (4). A connecting shaft (23) is used to transmit the rotation from the first planetary gear unit (4) to the second planetary gear unit (5). The connecting shaft (23) is a cylinder having a splined end and a gear shaped end. The input shaft (3) also pierces the connecting shaft (23). The input shaft (3) and the connecting shaft (23) are in a coaxial relation. Owing to a narrow air gap therebetween, relative rotation is allowed between the input shaft (3) and the connecting shaft (23). The splined end of the connecting shaft (23) is inserted into the spline (22) of the carrier (15). On the other hand, the gear shaped end of the connecting shaft (23) is a sun gear (24) of the second planetary gear unit (5).

The second planetary gear unit (5) comprises a plurality of planetary gears (26) meshing with the sun gear (24), a carrier (25) rotatably supporting the planetary gears (26) by planetary shafts (28) and an internal gear (29) meshing with the planetary gears (26). Like the first planetary gear unit (4), the planetary gear (26) consists of a central planetary gear part (26') and two planetary discs (27) and (27) holding the planetary gear part (26') from both sides. The outer diameter of the planetary discs (27) is larger than the diameter of the tooth edge circle of the planetary gear part (26').

The internal gear (29) has smooth sliding side surfaces (31) and (31) with large outer diameters and a central rugged surface having outer teeth (30) with a small outer diameter. The sliding surfaces (31) and (31) are kept in contact with the inner surface of the casing. However, the sliding surfaces (31) are not fixed to the casing and the internal gear (29) is permitted to rotate freely in the casing body (1). The sliding surfaces (31) and the smooth inner surface of the casing cooperate as a bearing. This corresponds to a slide bearing. However, other kinds of bearings, e.g. ball bearings, roller bearings, etc., can be used.

The output hole of the carrier (25) is shaped into a spline (32). A splined end of a connecting cylinder (33) is inserted in the spline (32) of the carrier (25). The connecting cylinder (33) is a long cylinder for coupling the carrier (25) with the output rotor (6). The connecting cylinder (33) is rotatably installed in a position being coaxial to the input shaft (3). There is an air gap between the outer surface of the input shaft (3) and the inner surface of the connecting cylinder (33). Therefore, both the connecting cylinder (33) and the input shaft (3) can rotate independently. The connecting cylinder (33) is rotatably supported by bearings (34) and (35) in the small cylindrical part of the casing.

An oil seal (36) is provided between an opening of the casing body (1) and the connecting cylinder (33) at the portion projecting from the casing. The inner space of the casing is tightly closed by two oil seals (12) and (36). Oil is contained in the casing for lubrication.

The end of the connecting cylinder (33) has a splined surface. The splined surface is inserted into a spined hole (37) of the output rotor (6). Thus, the carrier (25) is coupled with the output rotor (6) by the connecting cylinder (33).

A bearing (38) is mounted between a stepped part of the inner surface of the output rotor (6) and the output shaft (3). An inner race of the bearing (38) is in contact with the rotating hub (7) but it is spaced from the connecting cylinder (33) by a small gap. An outer race of the bearing (38) is in contact with the output rotor (6).

The rotating hub (7) has a central hole on which a spline is shaped. The fore end of the input shaft (3) with a spline (39) is inserted into the splined hole of the rotating hub (7). The rotating hub (7) is fixed by a nut (40) engaged with a thread part (41) shaped on the end of the input shaft (3).

A rotating disc (8) is connected to the rotating hub (7) by screws (43). The rotating disc (8) consists of a thin elastic plate (45) and an iron disc (46). The above-mentioned screws (43) couple an elastic plate (45) with the rotating hub (7). Screws (42) unify the iron disc (46) with the elastic plate (45) near the periphery. As shown in FIG. 2, the distances between the screws (42) and the screws (43) which connect the elastic plate (45) to the iron disc (46) and to the rotating hub (7) are so long that the elastic plate (45) is likely to bend inward when a weak axial force applied on the iron disc (46). However, the elastic plate (45) has enough angular rigidity to transmit torque from the rotating hub (7) to the iron disc (46), because the elastic plate 45) is shaped like a wave.

The output rotor (6) has a circular cavity on the inner side. There is a ring-shaped electromagnet (44) in the cavity. The electromagnet (44) is mounted on a side surface of the casing body (1) by a supporting plate (47) and screws. The electromagnet (44) is separated from the inner surface of the output rotor (6) by a narrow air gap. The electromagnet (44) is always at rest, because it is mounted on the casing. The output rotor (6) rotates either at a high speed level (with the input shaft (3)) or a low speed level. The rotating disc (8) always rotates at a high speed level. The narrow air gaps enable the three parts to rotate at different speed levels. The electromagnet (44) consists of a ferromagnetic core and coil wound around the core. Electric current can be applied to the coil through lead wires (49). This electromagnet (44) constitutes a disc-contacting device for keeping the rotating disc (8) in contact with the output rotor (6). When no current is supplied to the coil, the electromagnet (44) is not excited and the rotating disc (8) is separated from the output rotor (6).

When current is supplied to the coil, the electromagnet (44) is excited and magnetized. The magnetic force attracts the iron disc (46) of the rotating disc (8). The thin elastic plate (45) is brought into contact with the side of the output rotor (6). A strong friction force occurs between the iron disc (46) and the output rotor (6). This contact is maintained by the magnetic force.

The output rotor can also be made of a non-ferromagnetic material. But it is desirable for the output rotor (6) to be made of a ferromagnetic material, e.g., iron, steel, nickel, cobalt or ferromagnetic alloys. If the output rotor is ferromagnetic, a magnetic force reinforces the contact between the output rotor (6) and the iron disc (46), in addition to the friction force. Due to the friction force and the magnetic force, the output rotor (6) rotates at a high speed with the rotating disc (8).

The device for stopping the internal gear will now be explained. A solenoid (50) is fixed at the position of the second planetary gear unit (5) on the outer surface of the casing by a bracket (54) and screws. A bore is perforated in the casing at a side of the second planetary gear unit (converter unit). The solenoid (50) is equipped with a plunger (51) which moves in a radial direction of the casing. In this example, the solenoid (50) is a conventional unipolar solenoid. The plunger (51) is pushed inward in the radial direction by an elastic force of the spring (52). A stopper piece (53) is fitted to the edge of the plunger (51). A guide (56) is mounted at the hole of the casing. The stopper piece (53) slides in the guide (56). The stopper piece (53) penetrates the casing through the guide (56). The stopper piece (53) engages with the outer tooth (30) on the internal gear (29) of the second planetary gear unit when the plunger (51) is pushed forward. This engagement prevents the rotation of the internal gear (29). When the plunger (51) is pulled backward, the stopper piece (53) separates from the outer tooth (30) and the internal gear (29) rotates freely.

In this embodiment, a conventional unipolar solenoid is used to move the plunger back and forth. When electric current is supplied to the coil of the solenoid (50), the plunger (51) recedes backward and the stopper piece (53) is disengaged from the outer tooth (30). Otherwise, when no electric current is supplied to the solenoid, the plunger (51) is pushed forward by the elastic force of the spring (52) and the stopper piece (53) meshes with the outer tooth (30) of the internal gear (29). The internal gear (29) is kept in a rest state by the elastic force of the spring (52). Namely, the solenoid (50) and the stopper piece (53) constitute the internal gear stopping device.

Of course, other types of solenoids are available for the internal gear stopping device. For example, another internal gear stopping device is constructed by using a unipolar solenoid in a reverse disposition. Namely, when the electricity is supplied to the solenoid, the plunger extends till the stopper piece (53) meshes with the outer tooth (30). This example is advantageous in that the rest state of the internal gear is more stable, because the engagement between the stopper piece (53) and the outer tooth (30) is maintained by the magnetic force induced by the electric current, which is larger than the elastic force of the spring.

Furthermore, another internal gear stopping device can be assembled by a bipolar self holding solenoid which does not have a spring but which has a permanent magnet. The plunger is driven forward or backward by momentarily supplying electric current into a coil or coils to a front direction or reverse direction. The plunger can adopt two stable states—front state and back state. The magnetic force of the permanent magnet rather than the use of springs, keeps the plunger in either of the two stable states. Although bipolar self holding solenoids are rather expensive, they are more appropriate to a part of the internal gear stopping device, because the magnetic force is stronger than the elastic force of springs and electricity can be saved.

Besides solenoids, a motor with a reduction gear is also available for constructing the internal gear stopping device. In this case, the stopper piece moves either forward or backward according to the rotation direction of the motor.

In any case, the state in which the stopper piece (53) is disengaged from the outer tooth (30) is called an unexcited state and the state in which the stopper piece (53) is engaged with the outer tooth is called an excited state.

The function of the apparatus will now be explained.

In order to rotate the output rotor (6) at a low speed level, the switch of the solenoid (50) is turned off and the electromagnet (44) is left unexcited. The stopper piece (53) pushed by the spring (52) engages the outer tooth (30). The internal gear (29) is at rest. A narrow air gap separates the iron disc (46) from the output rotor (6), because the electromagnet (44) is unexcited. "A" denotes the rotation speed of the input shaft. The rotation speed of the carrier of the first planetary gear unit (4) (reduction rate: $R_1$) is $A/R_1$. The second planetary unit (5) functions as a reduction gear (reduction rate:$R_\square$), because the internal gear is fixed. The rotation speed of the carrier of the second planetary gear unit (5) is $A/R_1R_\square$. The rotation speed "B" of the output rotor (6) is equal to this speed, because the output rotor (6) is coupled with the carrier of the second planetary gear unit (5), $$B = \frac{A}{R_1 R_\square} \quad (9)$$

Namely, the output rotor rotates at a low speed.

On the contrary, in order to rotate the output rotor (6) at a high speed level, the switch of the solenoid (50) is turned on and the electromagnet (44) is excited. The stopper piece (53) is pulled back and separated from the outer tooth (30). The internal gear (29) of the second planetary gear unit (5) can rotate freely. The iron disc (46) is attracted by the electromagnet (44) into contact with the output rotor (6). The output rotor (6) rotates together with the rotating disc (8) by the friction force and the magnetic force. As the rotating disc (8) is fitted to the input shaft (3), the rotating speed "B" of the output rotor (6) is equal to the speed of the input shaft (3).

$$B = A \tag{10}$$

Thus, the output rotor (6) rotates at a high speed. In this case, the internal gear of the second planetary gear unit (5) (converter unit) rotates rapidly. Because the rotation speeds of the sun gear and the carrier are $A/R_1$ and $A$ respectively, substituting $T=1$ and $Q=R_1$, we obtain the rotation speed I of the internal gear $$I = \left\{ \frac{Z_s}{Z_\square} \left( 1 - \frac{1}{R_1} \right) + 1 \right\} A \tag{11}$$

As mentioned before, in this case, the internal gear rotates faster than the sun gear.

In principle, if more than two planetary gear units are used, any one of the units can be chosen as a converter unit in which the internal gear is rotatably mounted in the casing. But it is preferable to select the last unit to be a converter unit, because the free rotations of the internal gears are more moderate. The reason is now explained.

It is now assumed that the first planetary gear unit is chosen as the converter unit. The internal gear of the first unit can select either a free rotation state or a rest state, and the internal gear of the second unit is fixed. Thus, the rotation speed $I'_\square$ of the internal gear of the first unit is derived from Eq. (8) by substituting $T=R_1$ and $Q=1$, $$I' = \left\{ \frac{Z_s}{Z_1} (R_1 - 1) + R_1 \right\} A \tag{12}$$

As $R_1$ is larger than 2 without fail, Eq. (12) is larger than Eq. (11). The rotation speed of the internal gear is faster in the case of the first converter unit than in the case of the second converter unit. This result teaches that it is preferable to select the last unit as a converter unit to decrease the free rotation speed of the internal gear.

As mentioned before, when the rotating disc (8) is in contact with the output rotor (6), the internal gear of the converter unit must rotate freely. To accomplish this purpose, the internal gear stopping device and the disc rotating device should simultaneously be driven and undriven in a complementary manner. However, this is not so rigorous. Even if the complementary motions of the two devices are slightly discrepant, this apparatus will work well, because a slippage occurs between the output rotor (6) and the rotating disc (8). The slipping would alleviate the shock acting upon the teeth of the gear units.

In FIG. 2, the iron disc (46) can be replaced by some ferromagnetic material, e.g., 1 nickel, cobalt or alloys (Fe - Ni, Fe - Cr, etc.). FIG. 4 shows another embodiment of a disc-contacting device. A rotating disc (8) is a dish-like rigid body fitted to the input shaft (3). Relative rotation is forbidden but axial displacement is permitted between the rotating disc (8) and the input shaft (3). A spring (61) pushes the rotating disc (8) outward along an axial line. A solenoid (60) having a plunger (62) is installed at a point near the rotating disc (8). A roller (63) is supported at the front end of the plunger (62). When the plunger (62) is expanded by exciting the solenoid (60), the roller (63) brings the rotating disc (8) in contact with the output rotor (6). The rotating disc (8) has a plurality of protrusions (65) on a side contact wall. In accordance with the protrusion (65), cavities (64) are bored on a side wall of the output rotor (6). When the rotating disc (8) is brought into contact with the output rotor (6), the protrusions (65) soon penetrate the cavities (64). Then, the output rotor (6) rotates together with the rotating disc (8) except for a short initial slippage.

A disc-contacting device other than ones show in FIG. 1 and FIG. 4 is also available. For example, a device can also be constructed by using shape memory alloys. In this device, the elastic plate (45) in FIG. 1 is replaced by a thin shape memory alloy (e.g., Ni - Ti SMA), and a heater for heating the plate is installed near the rotating disc (8). The shape memory alloy has a critical temperature above and below which the shape of the alloy changes. Thus, a distorted shape of the plate pushing the side of the output rotor (6) has been memorized above the critical temperature. When the heater is left unexcited, the plate does not deform and the rotating disc is separated from the output rotor. When the heater is on, the shape memory alloy deforms to push the output rotor (6).

The advantages of the invention will now be explained.
(1) This apparatus can convert the rotation speed of the output rotor at a high speed level or at a low speed level.
(2) Both directions of rotation—clockwise and counterclockwise—can be transmitted.
(3) Because planetary gear units are used as reduction gears, a motor, an input shaft and an output rotor are arranged along the same axial line. This structure enables us to spare space and widen the freedom of design.
(4) This apparatus of the invention is one of the most appropriate driving devices for the drum type electric washing machine.

What I claim is:
1. An apparatus for changing the rotational speed of a mechanism comprising:
  an input shaft for receiving an input rotation,
  a plurality of planetary gear units, each having a sun gear, a plurality of planetary gears meshing with the sun gear, an internal gear meshing with the planetary gears and a carrier for rotatably supporting the planetary gears, the planetary gear units being positioned from first to last, respectively in an axial direction toward an output side of the apparatus around the input shaft, the carrier of a unit being connected to the sun gear of a next unit, the sun gear of the first unit being connected to the input shaft,
  an output rotor rotatably mounted on the input shaft without preventing relative rotation thereof, a casing containing the input shaft and all the planetary gear units, the casing rotatably supporting the input shaft and the internal gear of the last of the planetary gear units and fixing the internal gears of the other planetary gear units, a rotating disc fixed to the input shaft near the output rotor, a disc-contacting device for bringing the rotating disc into contact with the output rotor, an internal gear stopping device for stopping rotation of the internal gear being rotatably supported by the casing, and a connecting cylinder being pierced by the input shaft for connecting the carrier of the last planetary gear unit with the output rotor, wherein the internal gear stopping device and the disc-contacting device are operable in a complementary manner such that: the internal gear stopping device is engaged while the disc-contacting device is disengaged and the disc-contacting device is engaged while the internal gear stopping device is disengaged, the output rotor rotates at a high speed when the disc-contacting device engages the rotating disc with the output rotor, and the output rotor rotates at a low speed when the internal gear stopping device is engaged, and wherein the internal gear stopping device comprises:

a solenoid having a plunger which extends or retracts in an axial direction, a stopper piece attached to the plunger, a guide for guiding the stopper piece in the axial direction, and a bracket for fixing the solenoid to the casing, an outer surface of the internal gear of the planetary gear unit being permitted rotation in the casing includes an outer toothed surface, such that: when the solenoid is excited to one direction, the stopper piece is brought into engagement with the outer toothed surface of the internal gear and the internal gear is stopped; and when the solenoid is excited to the other direction, the stopper piece disengages from the outer toothed surface and the internal gear can rotate freely.

2. An apparatus as claimed in claim 1, wherein the solenoid is a unipolar solenoid comprising:

a ferromagnetic yoke, a coil, and a spring, wherein the spring biases the plunger to one direction and the coil moves the plunger to an opposite direction when supplied an electric current.

3. An apparatus as claimed in claim 1, wherein the solenoid is a bipolar self holding solenoid comprising:

a ferromagnetic yoke, at least one coil, and a plurality of permanent magnets, the permanent magnets being able to keep the plunger positioned at either of two points and the coil capable of displacing the plunger from one point to the other point when electrified.

4. An apparatus for changing the rotational speed of a mechanism comprising:

an input shaft for receiving an input rotation, a plurality of planetary gear units, each having a sun gear, a plurality of planetary gears meshing, with the sun gear, an internal gear meshing with the planetary gears and a carrier for rotatably supporting the planetary gears, the planetary gear units being positioned from first to last, respectively in an axial direction toward an output side of the apparatus around the input shaft, the carrier of a unit being connected to the sun gear of a next unit, the sun gear of the first unit being connected to the input shaft, an output rotor rotatably mounted on the input shaft without preventing relative rotation thereof, a casing containing the input shaft and all the planetary gear units, the casing rotatably supporting the input shaft and the internal gear of one of the planetary gear units and fixing the internal gears of the other planetary gear units, a rotating disc fixed to the input shaft near the output rotor, a disc-contacting device for bringing the rotating disc into contact with the output rotor, an internal gear stopping device for stopping rotation of the internal gear being rotatably supported by the casing, a connecting cylinder being pierced by the input shaft for connecting the carrier of the last planetary gear unit with the output rotor, wherein the internal gear stopping device and the disc-contacting device are operable in a complementary manner such that: the internal gear stopping device is engaged while the disc-contacting device is disengaged and the disc-contacting device is engaged while the internal gear stopping device is disengaged, the output rotor rotates at a high speed when the disc contacting device engages the rotating disc with the output rotor, and the output rotor rotates at a low speed when the internal gear stopping device is engaged, a solenoid having a plunger which extends or contracts in an axial direction, a stopper piece attached to the plunger, a guide for guiding the stopper piece in the axial direction, and a bracket for fixing the solenoid to the casing, wherein an outer surface of the internal gear of the planetary gear unit being permitted rotation in the casing includes an outer toothed surface, such that;

when the solenoid is excited to one direction, the stopper piece is brought into engagement with the outer toothed surface of the internal gear and the internal gear is stopped; and when the solenoid is excited to the other direction, the stopper piece disengages from the outer toothed surface and the internal gear can rotate freely.

5. An apparatus as claimed in claim 4, wherein the solenoid is a unipolar solenoid comprising;

a ferromagnetic yoke, a coil, and a spring, wherein the spring biases the plunger to one direction and the coil moves the plunger to an opposite direction when supplied an electric current.

6. An apparatus as claimed in claim 4, wherein the solenoid is a bipolar self holding solenoid comprising:

a ferromagnetic yoke, at least one coil, and a plurality of permanent magnets, the permanent magnets being able to keep the plunger positioned at either of two points and the coil capable of displacing the plunger from one point to the other point when electrified.

* * * * *